Patented Mar. 3, 1931

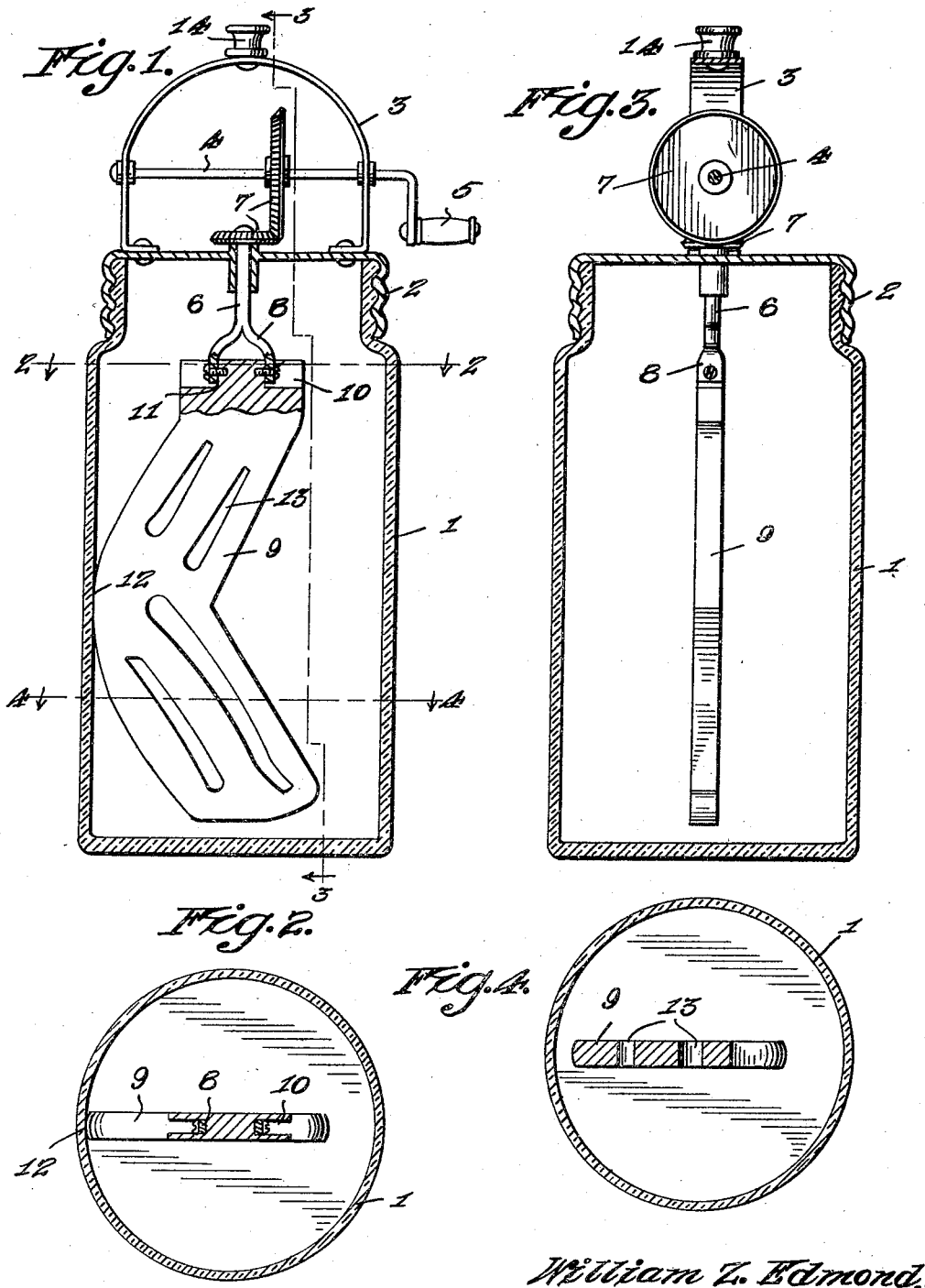

1,795,252

UNITED STATES PATENT OFFICE

WILLIAM Z. EDMOND, OF SPEED, KANSAS

CHURN

Application filed May 7, 1930. Serial No. 450,476.

This invention relates to a churn, the general object of the invention being to provide a cap, a dasher having its shaft rotatably supported by the cap, with means for rotating the shaft, said cap being formed to fit over a fruit jar or the like so that the parts can be used with such a jar to form a churn or the like.

Another object of the invention is to so form the dasher that the cream is thoroughly whipped during the rotation of the dasher.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a vertical sectional view through the churn.

Figure 2 is a section on line 2—2 of Figure 1.

Figure 3 is a section on line 3—3 of Figure 1.

Figure 4 is a section on line 4—4 of Figure 1.

In these views, the numeral 1 indicates the jar or container and the numeral 2 indicates the cap therefor. An inverted yoke-shaped member 3 has the extremities of its limbs connected with the top of the cap and a horizontal shaft 4 is journaled in said member. One end of this shaft is provided with the handle 5. A vertical shaft 6 is journaled in the center of the cap and is connected with the shaft 4 by the gears 7. The lower end of the shaft 6 is forked, as shown at 8.

A dasher 9, formed of a narrow strip of wood or any other suitable material, has the notches 10 in its upper end into which the prongs of the fork 8 extend and the extremities of these prongs are connected with the portion of the dasher between the notches, as shown at 11. This dasher is made substantially in the form of a flat V with its apex rounded, as shown at 12, so that this rounded part will engage the walls of the jar as the dasher is rotated, with the ends of the dasher arranged at the center of the jar, thus causing the dasher to thoroughly whip the cream or other material in the jar during the rotation of the dasher. The dasher is provided with the upper and lower slots 13 which are elongated and of irregular shape.

From the foregoing it will be seen that by turning the shaft 4, the dasher will be rotated and the jar can be held against movement by the handle 14 on the top of the yoke member. It will also be seen that the cap can be readily placed on a fruit or other jar having a screw top.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A churn comprising a receptacle, a dasher composed of a flat strip of substantially V shape with its apex rounded to engage the walls of the receptacle as the dasher is rotated, with the ends of the dasher arranged at the center of the receptacle and means connected with the upper end of the dasher for rotating the same, said dasher having elongated slots therein.

In testimony whereof I affix my signature.

WILLIAM Z. EDMOND.